(12) United States Patent
Zangirolami et al.

(10) Patent No.: US 12,486,339 B2
(45) Date of Patent: Dec. 2, 2025

(54) METHOD FOR OBTAINING FUNCTIONALIZED POLYMERIC SURFACES WITH PHOTOSENSITIZERS, FUNCTIONALIZED POLYMERIC MATERIAL AND USE THEREOF

(71) Applicants: UNIVERSIDADE DE SÃO PAULO, São Paulo (BR); UNIVERSIDADE DE COIMBRA, Coimbra (PT)

(72) Inventors: Amanda Cristina Zangirolami, São Carlos (BR); Kate Cristina Blanco, São Carlos (BR); Vanderlei Salvador Bagnato, São Carlos (BR); Natalia Mayumi Inada, São Carlos (BR); Carolina Dos Santos Vinagreiro, Coimbra (PT); Lucas Danilo Dias, Coimbra (PT); Luís Guilherme da Silva Arnaut Moreira, Coimbra (PT); Maria Miguens Pereira, Coimbra (PT)

(73) Assignees: UNIVERSIDADE DE SÃO PAULO, São Paulo (BR); UNIVERSIDADE DE COIMBRA, Coimbra (PT)

( * ) Notice: Subject to any disclaimer, the term of this patent is extended or adjusted under 35 U.S.C. 154(b) by 765 days.

(21) Appl. No.: 17/627,675

(22) PCT Filed: Jul. 15, 2020

(86) PCT No.: PCT/BR2020/050263
§ 371 (c)(1),
(2) Date: Jan. 16, 2022

(87) PCT Pub. No.: WO2021/007638
PCT Pub. Date: Jan. 21, 2021

(65) Prior Publication Data
US 2022/0259334 A1 Aug. 18, 2022

(30) Foreign Application Priority Data

Jul. 16, 2019 (BR) .......................... 1020190146818

(51) Int. Cl.
| | | |
|---|---|---|
| C08C 19/44 | (2006.01) | |
| C08C 19/25 | (2006.01) | |
| C08F 8/14 | (2006.01) | |

(52) U.S. Cl.
CPC .............. C08C 19/44 (2013.01); C08C 19/25 (2013.01); C08F 8/14 (2013.01)

(58) Field of Classification Search
CPC ................... C08J 7/065; C08J 7/12
See application file for complete search history.

(56) References Cited

U.S. PATENT DOCUMENTS

2009/0292357 A1* 11/2009 McCoy ............... C09B 67/0097
427/430.1

FOREIGN PATENT DOCUMENTS

| CN | 103396516 | * 11/2013 |
| CN | 104877056 | * 9/2015 |
| CN | 108904474 | * 11/2018 |

OTHER PUBLICATIONS

Wang, Talanta, vol. 70, Issue 1, Aug. 15, 2006, p. 160-168 (Year: 2006).*

(Continued)

*Primary Examiner* — Robert C Boyle
(74) *Attorney, Agent, or Firm* — Rivka Friedman (57) ABSTRACT

The present invention describes methods for obtaining functionalized polymeric surfaces (MPn-PSm) from polymers or copolymers with appropriate functionalizations (X), which can be a halogen of a leaving group, such as polyvinyl chloride (MP1) and (chloromethyl) polystyrene-Merrifield (MP2), and curcumin photosensitizers (PS1), meso-tetra (aryl) porphyrins, chlorins or bacteriochlorins halogenated (Continued)

and functionalized with nucleophilic groups (PS2), in particular including P2 of the type meso-imidazoyl-porphyrins, chlorins or bacteriochlorins (PS3). The structures of all the photosensitizers in the present application incorporate a functional group (Y), which is a OH, SH or NH 2 nucleophile. The application also describes the covalent bonding process of the photosensitizers PS1-PS3 to the functional polymeric materials MP1-MP2 by means of a nucleophilic substitution reaction to prepare the MPn-Psm products. The formed products prevent microbial proliferation, which can cause the serious infections that are one of the main causes of death in patients using these devices.

7 Claims, 4 Drawing Sheets

(56) References Cited

OTHER PUBLICATIONS

Translation of CN 104877056 (Year: 2015).*
Tsaplev, Dyes and Pigments 177 (2020) 108327 (p. 1-7). (Year: 2020).*
Translation of CN 103396516 (Year: 2013).*
Translation of CN 108904474 (Year: 2018).*
Bourdon, Photochem. Photobiol. Sci., 2002, 1, p. 709-714 (Year: 2002).*

* cited by examiner

METHOD FOR OBTAINING FUNCTIONALIZED POLYMERIC SURFACES WITH PHOTOSENSITIZERS, FUNCTIONALIZED POLYMERIC MATERIAL AND USE THEREOF

FIELD OF INVENTION

The present invention applies to the area of polymer functionalization, being essentially composed of a method to bind photosensitizing molecules to polymeric surfaces, each of them containing the appropriate chemical functionalities for establishing thermodynamically stable covalent chemical bonds, originating products consisting of a pair of Photosensitizing Polymeric Material (MPn-PSm). These functionalized materials, in the dark, or, preferably when illuminated with appropriate wavelengths promote photodynamic action, prevent the formation of microbial colonies on the surface, while eliminating microorganisms present in the medium and in contact with such surfaces.

More specifically, it applies to biomedical devices of a polymeric nature used in life support, such as endotracheal tube, catheters, probes, reservoirs, gloves, tracheostomy tube, intravenous infusion scalpel, nasal oxygen catheter, tracheal suction tube, with and without valve, packaging and instrumental storage bags.

BASICS OF INVENTION

Immunosuppressed patients carrying these devices in a hospital setting are, in general, submitted to standard procedures involving the use of antibiotics for infection control leading, in most cases, to the development of multidrug-resistant bacteria to the antibiotics on the market.

The endotracheal tube is an example of a routine device to aid mechanical respiration in patients with respiratory problems, postoperative or post-traumatic traumas, that on its surface there is a common development of microbial colonies and in most cases leads to the condition of Mechanical Ventilation Associated Pneumonia. Data reported by Zeitoun, S. S. et al. (2001) refer that intubated patients present a risk of death resulting from microbial infections 21 times higher when compared to non-intubated patients, being one of the main causes of death of these intubated patients.

Blood bags are another example of devices used to transport and store donor blood until it is needed for a transfusion. Contaminations contracted in transfusions are very serious, as they can cause a generalized infection in the patient.

The transportation of organs for transplantation should be performed in packaging that does not create a risk of microbial contamination or alter the integrity of the organ, and as such it is of the utmost importance to ensure aseptic conditions in medical devices for transport and storage of organs.

The present invention describes the process of binding photosensitizers (PS) of curcumin groups and derivatives (PS1) porphyrins and derivatives (chlorin and bacteriochlorin) (PS2 and PS3) containing each component the appropriate nucleophilic group to establish a stable covalent chemical bond (ether, amine, thioether) with polymeric surfaces (MP1 and MP2) containing appropriate functional groups (X) to generate products of the type (MPn-PSm).

The products (MPn-PSm) developed in the present invention are stable in aqueous solutions of different pH at physiological temperature and after irradiation with light of appropriate wavelength.

The products consisting of polymeric surfaces functionalized with covalently linked photosensitizers (PS) (MPn-PSm) prevent the development of these infections by microorganisms in the absence of light, reducing the risk of death. While in the presence of light with appropriate wavelength, such products inactivate the formation of microorganisms and biofilms by photodynamic action, reducing the number of deaths caused by multidrug-resistant microbial infections to antibiotics on the market.

STATE OF THE ART

The inactivation of microorganisms by photodynamic therapy (PDT) involves the presence of three components: photosensitizer (PS), light source of appropriate wavelength, and oxygen.

A photosensitizer (PS) is a chemical entity that absorbs light at a specific wavelength, changing its chemical and/or physical properties. Photosensitizers (PSs) absorb energy from light by transitioning to an excited state and consequently transferring energy. PS can act by different mechanisms: type I and type II. In the type I mechanism, photosensitizers (PSs) react directly with molecules to produce active free radicals (ROS) and radical ions. In the type II mechanism energy transfer occurs to molecular oxygen, producing singlet oxygen capable of inactivating microorganisms (Pucelik et al. (2018) (Plos One, 13 (1): e0191777).

However, the development of microbial resistance resulting from the action of reactive oxygen species (ROS) generated by photodynamic action (PDT) has not been reported so far.

Bezman et al. (1978) (Photochemistry and Photobiology, 28, 325-329, 1978) disclosed the photodynamic inactivation of *Escherichia coli* using the photosensitizer (PS) Rose Bengal covalently linked by ester-type bonding to beads of a copolymer of polystyrene with chloromethyl styrene. This ester-like covalent bond is susceptible to hydrolysis in biological media and by the action of light. The preparation process and the MPn-PSm type products described in the present invention, on the other hand, involve different photosensitizers (PS) containing the selected functionalities (NH2, OH, SH) to form a different stable covalent bond (amine, ether and thioether) with different polymers, including PVC and Merrifield, stable in biological media and under light irradiation.

Patent WO 1993/000815 discloses photobactericidal compositions comprising a textile fiber-type polymer (cellulose) and a photosensitizer (porphyrin or phthalocyanine) linked only by electrostatic interaction, applied for surface sterilization. The photosensitizers used are of the non-functionalized meso-tetrapyridylporphyrin or phthalocyanine type and are only adsorbed to the polymers by electrostatic bonds.

In documents EP1203052/U.S. Pat. No. 6,420,455B1 a polymeric composition is disclosed, and articles using such composition, which shows surface antimicrobial activity. However, there is no mention of the presence of covalent bonds with the photosensitizing agents, at least one of which is xanthene. The interaction of the photosensitizer with the polymeric material is purely physical (physical mixing) with some electrostatic interactions, without formation of essentially chemical interactions. Although it is mentioned in that document the effect of the agents even in periods with absence of light stimulus, the differences are evident regarding the level of interaction, since the surface functionalization proposed in the present invention involves the promotion of the biological surface characteristics, however, maintaining the mechanical requirements and other functionalities of the base polymeric material.

Document RU 2663061 presents a polymer-based antimicrobial agent for conferring bactericidal properties, whose molecules contain at least one nitrogen atom with a pair of free electrons, so that the biocide is coordinated by an unstable electrostatic-type bond to a metal complex, which may contain magnesium porphyrin as a central atom, in addition to other chemical groups such as phthalocyanine. The only similarity consists in the application of porphyrin-type photosensitizers, but with structures and consequently photodynamic properties different from those described in the present invention. Furthermore, the objective of the said invention in relation to the polymers used is not the functionalization of the surface of biomedical devices using covalent binding.

The novelty of the present invention is based on the functionalization of polymeric surfaces of the polyvinyl chloride, halomethyl polystyrene or copolymers thereof, containing leaving groups (Br, Cl, I or F), in particular PVC (MP1) or Merrifield (MP2) containing chlorine (Cl) leaving groups, which bind with photosensitizers. These compounds contain the appropriate functional groups (OH, N—, or SH), and by forming stable covalent bonds, both in biological media and in the presence of light, MPn-PSm-like products are formed, which, when irradiated with light of appropriate wavelength, have application as biomedical devices with antimicrobial action.

It is also emphasized that the material obtained through the process of this invention can significantly decrease the risk of infections and pneumonias of hospitalized and intubated patients. The polymeric material covalently functionalized with photosensitizers (PS) has therefore the ability to promote an improvement in the hospital environment, adding great benefits to public health.

BRIEF DESCRIPTION OF THE INVENTION

This invention describes a process for preparing a polymeric product (MPn-PSm) comprising polymers or copolymers containing appropriate functional groups. The polymeric products (MPn-PSm) developed in this invention decrease microbial growth in the absence of light and exhibit antimicrobial activity when exposed to light of an appropriate wavelength. The polymeric materials (MPn-PSm) linked by irreversible covalent bonding to photosensitizers (PSm) are particularly relevant for microbial inactivation of medical devices, endotracheal tube, organ storage and transport packaging, blood storage and transport bags, food storage and transport packaging, among others.

BRIEF DESCRIPTION OF THE FIGURES

To obtain a full and complete view of the subject matter of this invention, the figures to which reference is made are shown as follows.

DETAILED DESCRIPTION OF THE INVENTION

The present invention relates to the functionalization of polymeric, or copolymeric materials, by covalent binding with photosensitizers (PSs), which exhibit antimicrobial activity in the dark, or preferably when exposed to light (PDT) contributing to the decrease of adhesion and inactivation of microorganisms in biomedical devices built with these materials. These polymers are preferably from the class of vinyl polyhalides, where the halides or halogens are diatomic molecules of the elements from group 17 of the periodic table, containing leaving groups Fluorine (F), Chlorine (Cl), Bromine (Br) or Iodine (I), preferably Chlorine (Cl).

In the present invention processes are described for obtaining functionalized polymeric surfaces (MPn-PSm) from the polymers or copolymers with appropriate functionalizations (X), which may be a halogen or a leaving group, in particular polyvinyl chloride (MP1) and (chloromethyl) polystyrene-merrifield (MP2), and the photosensitizers (PSs) of the curcumin type and derivatives (PS1), meso-tetra aryl porphyrins and derivatives, chlorins and bacteriochlorins halogenated and functionalized with nucleophilic groups (PS2), in particular including those of the meso-imidazoyl-porphyrin type and derivatives (chlorins and bacteriochlorins) (PS3). All the photosensitizers (PSs) of the present invention incorporate in their structure the functional group (Y), this being a nucleophile of the OH, SH or NH2 type.

That is, the present invention describes the process of covalent bonding (D) of the ether, amine or thioether type of the PSs: PS1, PS2 and PS3 to the functionalized polymeric materials MP1 and MP2 through a nucleophilic substitution reaction to prepare the MPn-PSm products. In addition, it also involves the application of the MPn-PSm polymeric products obtained in the reduction of microorganism adhesion and inactivation of microorganisms by photodynamic action (PDT), namely in: probes, catheters, reservoirs, tracheostomy tube, intravenous infusion scalp, nasal oxygen catheter, hemodialysis catheter, rectal probe, packaging for transportation and storage of organs, urethral probe, tracheal suction probe, used in hospital environment by humans and animals.

The products formed by the MPn-PSm polymeric surfaces developed in the present invention prevent microbial proliferation, which is the cause of numerous serious infections, currently one of the main reasons for death in hospitalized patients using these devices. Additionally, these MPn-PSm polymeric materials have important application in the preparation of packaging for food storage.

The process proposed herein is simple and cost-effective to obtain polymeric materials functionalized with photosensitizers of type MPn-PSm (with n from 1 to 2 and m from 1 to 3, namely MP1-PS1; MP1-PS2; MP1-PS3; MP2-PS1; MP2-PS2 and MP2-PS3 (according to Table 1) obtained through direct nucleophilic substitution reaction between commercially obtained MP1 or MP2 type polymeric materials containing in their structure leaving groups in particular halogens (fluorine, chlorine, bromine or iodine) and each of the PS1 type photosensitizers, PS2 or PS3 containing the nucleophilic groups OH, SH or N—.

The structure of the polymeric materials MP1 (Polyvinyl chloride (PVC) of general formula [$C_2H_3Cl$]n) or MP2 ((Chloromethyl) polystyrene of general formula [$C_9H_9Cl$]n) allows the presence of the halogen leaving groups to be easily identified:

MP1

MP2

Origin of Photosensitizers

The photosensitizer PS1 with hydroxyl-type nucleophilic groups with the function of nucleophile, designated by the trivial name curcumin and of IUPAC name (1E,6E)-1,7-bis(4-hydroxy-3-methoxyphenyl)-1,6-heptadiene-3,5-dione, and its derivatives:

PS1

The photosensitizers of the PS2 and PS3 families encompass porphyrins functionalized with nucleophilic groups of hydroxyl, amine or thiol type (formulas II to IX; with the two beta pyrrole positions ( - - - ) in the form of double bonds) and their reduced derivatives chlorins (with one position ( - - - ) in the form of single bond and the other ( - - - ) in the form of double bond) and bacteriochlorins (with the two positions ( - - - ) in the form of single bonds).

The symmetric porphyrins (formulas II to IV) with both positions ( - - - ) in the form of double bonds) were synthesized following the nitrobenzene or nitrobenzene-NaY method which consists of mixing 4 equivalents of the halogenated aldehyde containing the nucleophile Y (OH, N— or SH) in one of the other positions, with a selected structure, with pyrrole under aerobic conditions using as solvents a mixture of acetic acid or propionic acid and nitrobenzene without or with a reusable catalyst, of the NaY zeolite type, between 10° and 140° C.

After hot NaY filtration, the porphyrins precipitated directly from the reaction medium after cooling, or by methanol addition, or were purified by flash chromatography, obtaining the symmetric photosensitizers of the PS2 family (formulas II-IV). The non-symmetric halogenated porphyrins (formulas V to VII) with both positions ( - - - ) in the form of double bonds) were synthesized following the nitrobenzene or nitrobenzene-NaY method that consists in mixing 2 equivalents of halogenated aldehyde containing the nucleophile Y (OH, N— or SH) in one of the other positions, with a selected structure, with 2 equivalents of formaldehyde or respective acetal, with 4 equivalents of pyrrole, under aerobic conditions, using as solvents a mixture of acetic acid or propionic acid and nitrobenzene without or with a reusable catalyst, of the NaY zeolite type, between 10° and 140° C. After hot NaY filtration, the porphyrins were purified by preparative flash chromatography, obtaining the non-symmetric photosensitizers of the PS2 family (formulas V-VII):

= represents a single or double carbon-carbon bond

The synthesis of symmetric porphyrins (Formulas VII with the two positions ( - - - ) in the form of double bonds) were synthesized following the nitrobenzene or nitrobenzene-NaY method which consists of mixing 4 equivalents of 1-methyl-2-imidazolcarboxaldehyde with 4 equivalents of pyrrole, under aerobic conditions; using as solvents a mixture of acetic or propionic acid and nitrobenzene without or with reusable zeolite-type NaY catalyst, between 100 to 140° C. After hot NaY filtration, the porphyrin (Formula VIII) was purified by flash chromatography.

The synthesis of non-symmetric porphyrin (formulas IX) with the two positions ( - - - ) in the form of double bonds) were synthesized following the nitrobenzene or nitrobenzene-NaY method which consists of mixing 2 equivalents of 1-methyl-2-imidazolcarboxaldehyde with 2 equivalents of formaldehyde or its acetal, with 4 equivalents of pyrrole, under aerobic conditions, using as solvents a mixture of acetic or propionic acid and nitrobenzene without or with a reusable catalyst of the NaY zeolite type, between 10° and 140° C. After hot NaY filtration, the porphyrin (Formula IX) was purified by flash chromatography.

= represents a single or double carbon-carbon bond

The metal complexes of porphyrinic PSs of type PS2 or PS3 (Formulas II to VII; VIII and IX), were prepared by mixing a solution of the respective porphyrins dissolved in an appropriate solvent preferably in chloroform or DMF, to which is added a saturated solution of the appropriate metal salt ($Zn(OAc)_2$, $Pd(OAc)_2$ or $AlCl_3$, between 4° and 150° C. After completion of the complexation reaction, the reaction mixture was purified by successive washes with a saturated aqueous solution of sodium bicarbonate and water. When necessary, the metal complex was purified by flash chromatography.

The corresponding chlorins with one position ( - - - ) in the single bond form and the other ( - - - ) in the double bond form were synthesized according to the method described by Pereira M. M. et al, in which one of the porphyrin-type precursors (formulas II to IX), prepared according to the above process, was mixed in the solid state with a small excess of p-toluenesulfonylhydrazine (15 equivalents) in a Schlenk tube, and then placed under vacuum at 0.1 bar for 1 hour. The mixture is then heated to between 120 and 140° C. for the time optimized for each substrate. The reaction mixture was dissolved in a minimal amount of an organic solvent and washed sequentially with sodium hydroxide and water. The solid obtained was dissolved in DME and $FeCl_3 \cdot 6H_2O$ (1 equiv.) was added to the solution, followed by slow addition of hydrogen peroxide (3% in water). The reaction was terminated when the disappearance of the bacteriochlorin absorption peak (≈750 nm) was observed. The corresponding chlorines (Formula II to VII with one position ( - - - ) in the single bond form and the other ( - - - ) in the double bond form) were purified by washing followed by flash chromatography.

The corresponding bacteriochlorins with the two ( - - - ) positions in the form of single bonds of PS2 and PS3 were synthesized according to the method described by Pereira M. M. et al, in which the porphyrin is mixed with an excess of p-toluenesulfonylhydrazine (40 equivalents) in a schlenk tube, and then placed under vacuum (0.1 bar) for 1 hour. The mixture is then heated at 140° C. for the time optimized for each porphyrin (Formula II to VII where ( - - - ) is a double bond). After cooling to room temperature, the corresponding bacteriochlorins (Formula II to IX where ( - - - ) is a single bond) are purified by washing or flash chromatography.

Table 1 discusses all possible combinations of polymeric materials and photosensitizers (MPn-PSm) and their possible structures, with the D component always being an ether (O), thioether(S) or an amine (N—) covalent bond (Table 1):

TABLE 1 possible combinations of polymeric materials and photosensitizers (MPn-PSm) and their possible structures

| Ref. | Chemical Structure |
|---|---|
| MP1-PS1 | |
| MP1-PS2 (II and III) | |
| MP1-PS2 (IV) | |

TABLE 1-continued possible combinations of polymeric materials and photosensitizers (MPn-PSm) and their possible structures

| Ref. | Chemical Structure |
|---|---|
| MP1-PS2 (V and VI) |  |
| MP1-PS2 (VII) |  |

TABLE 1-continued possible combinations of polymeric materials and photosensitizers (MPn-PSm) and their possible structures

| Ref. | Chemical Structure |
|---|---|
| MP1-PS3 (VIII and IX) |  |
| MP2-PS1 |  |
| MP2-PS2 (II and III) |  |

TABLE 1-continued possible combinations of polymeric materials and photosensitizers (MPn-PSm) and their possible structures

| Ref. | Chemical Structure |
|---|---|
| MP2-PS2 (IV) |  |
| MP2-PS2 (V and VI) |  |

TABLE 1-continued possible combinations of polymeric materials and photosensitizers (MPn-PSm) and their possible structures

| Ref. | Chemical Structure |
|---|---|
| MP2-PS2 (VII) |  |
| MP2-PS3 |  |

Table 2 discusses all possible substituents (R1, R2, Z, Z' and M) for the MPn-PSm combinations explained in Table 1:

TABLE 2

MPn-PSm combinations with the possible substitutions R1, R2, Z, Z' and M.

| Ref. | Var. | $R_1$ | $R_2$ | Z | Z' | M |
|---|---|---|---|---|---|---|
| MP1-PS1 or MP2-PS1 | I | — | — | H or $C_nH_{2n+1}$ CO—$C_nH_{2n+1}$ $1 < n < 12$ | H or $C_nH_{2n+1}$ $1 < n < 12$ | — |
| MP1-PS2 or MP2-PS1 | II | (aryl group with A, B, A', B', Y) | (aryl group with A, B, A', B', Y) | — | — | H or Zn or Al or Pd |

A = F or Cl; A' = H or F or Cl; B = B' = H; Y = OH, SH, N—

| MP1-PS2 or MP2-PS1 | III | (aryl group with A, B, A', B', Y) | (aryl group with A, B, A', B', Y) | — | — | H or Zn or Al or Pd |

A = F or Cl; A' = H or F or Cl; B = F or Cl; B' = H or F or Cl; Y = OH, SH, N—

| MP1-PS2 or MP2-PS1 | IV | (aryl group with A, B, A', C, Y) | (aryl group with A, B, A', C, Y) | — | — | H or Zn or Al or Pd |

A = F or Cl; A' = H or F or Cl; B = H or F or Cl; C = H or F or Cl; Y = OH, SH, N—

| MP1-PS2 or MP2-PS1 | V | (aryl group with A, B, A', B', Y) | H | — | — | H or Zn or Al or Pd |

A = F or Cl; A' = H or F or Cl; B = B' = H; Y = OH, SH, N—

| MP1-PS2 or MP2-PS1 | VI | (aryl group with A, B, A', B', Y) | H | — | — | H or Zn or Al or Pd |

A = F or Cl; A' = H or F or Cl; B = F or Cl; B' = H or F or Cl; Y = OH, SH, N—

| MP1-PS2 or MP2-PS1 | VII | (aryl group with A, B, A', C, Y) | H | — | — | H or Zn or Al or Pd |

A = F or Cl; A' = H or F or Cl; B = H or F or Cl; C = H or F or Cl; Y = OH, SH, N—

TABLE 2-continued

MPn-PSm combinations with the possible substitutions R1, R2, Z, Z' and M.

| Ref. | Var. | R$_1$ | R$_2$ | Z | Z' | M |
|---|---|---|---|---|---|---|
| MP1-PS3 or MP2-PS3 | VIII |  |  | — | — | H or Zn or Al or Pd |
| MP1-PS3 or MP2-PS3 | IX | H |  | | | or Zn or Al or Pd |

Preparation Process of Functionalized Polymer Products with Photosensitizers (PS) of the MPn-PSm Type All PSs (PS1, PS2, PS3) used in the present invention incorporate in their structure nucleophiles (OH, N— or SH), with specific chemical characteristics, allowing to develop a simple and efficient process to make a covalent bond with polymeric materials (MP1 and MP2), containing in their structure halogen type leaving groups, through a nucleophilic substitution reaction, following the following steps:

Dissolution of the photosensitizer (PS) selected from the PS1, PS2 or PS3 family with an organic base (triethylamine, 1,8-diazabicyclo[5.4.0]und-7-ene (DBU), 1,5-diazabicyclo[4.3.0]non-5-ene (DBN) or pyridine) or preferably inorganic ($CaCO_3$, $CeCO_3$, NaOH, KOH, $Ba(OH)_2$, $Al(OH)_3$, $Mg(OH)_2$, $Be(OH)_2$, $Ca(OH)_2$) in a solvent of the type dimethylformamide (DMF), dimethoxyethane (DME), tetrahydrofuran (THF) and derivatives, dimethylpyrrolidone, dichloromethane, ethyl acetate or preferably dimethylsulfoxide (DMSO) to form the solution referred to hereafter as Sol A;

Immerse the polymeric material MP1 or MP2 in Sol A solution and leave at a temperature between 0° C. and 40° C. for 0.5 to 48 hours, preferably in the absence of oxygen. Then, remove the covalently linked polymeric material to the desired photosensitizer (PS) (MPn-PSm) from Sol A solution and wash one to ten times with an organic solvent, preferably with DMSO, and then with an organic solvent of lower boiling point, preferably ethanol.

Dry MPn-PSm, preferably at room temperature, under vacuum and store in the presence or preferably in the absence of oxygen and light.

Figure 1:
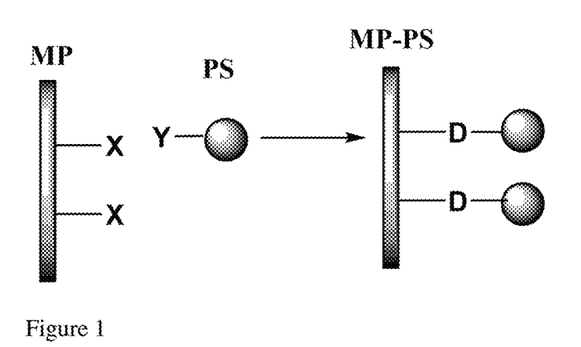
FIG. 1 shows a scheme of the functionalization of a polymeric material (MPn) containing an leaving group (X), which can be a halogen atom, reacting with a photosensitizer (PSm) that can be of the curcumin type and derivatives or tetrapyrrolic macrocycle more specifically porphyrin and derivatives (chlorin or bacteriochlorin) containing a nucleophilic group (Y), which can be of the type —OH, —N— or —SH, originating a functionalized polymeric material called (MPn-PSm).
Figure 2:
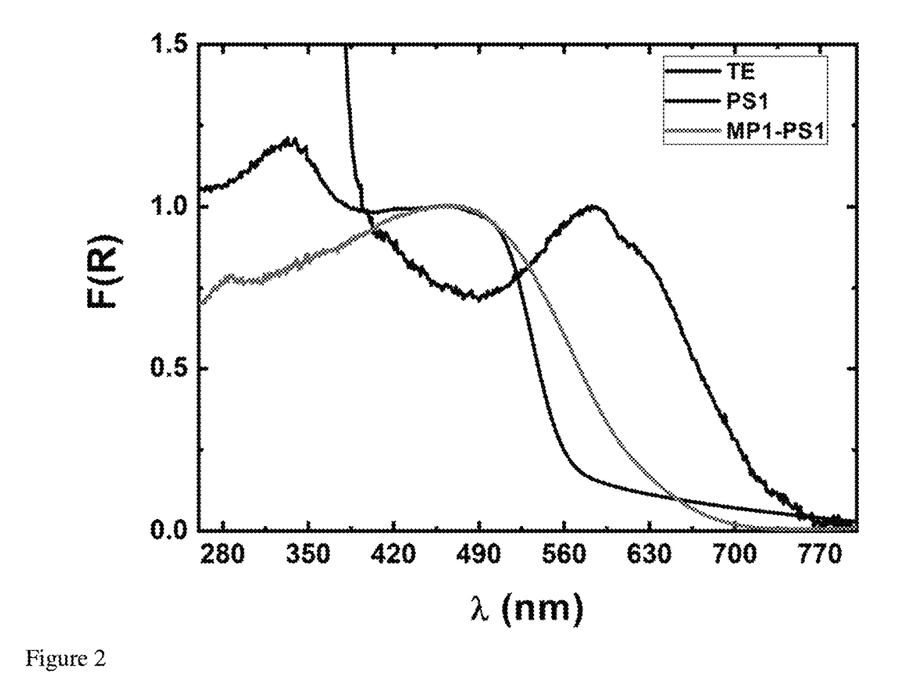
FIG. 2 shows a graph with data from an example of UV-Vis characterization comparing the polymeric material (MP1) (black curve) and the curcumin photosensitizer (PS1) (blue curve) separately, as an endotracheal tube functionalized with the curcumin photosensitizer (MP1-PS1) (green curve).

The functionalized polymeric products prepared in the present invention, hereafter referred to as MP1-PS1, MP1-PS2 (Formulas II to VII), MP1-PS3 (VIII and IX), MP2-PS1, MP2-PS2 (Formulas II to VII) and MP2-PS3 (VIII and IX) were characterized by Cary 5000 UV-Vis diffuse transmittance spectroscopy confirming the binding of the photosensitizer (PS) to the polymeric material by the presence in the polymeric material of an absorption band typical of each photosensitizer (PS), as per FIG. 2 of the example embodiment.

Figure 3:
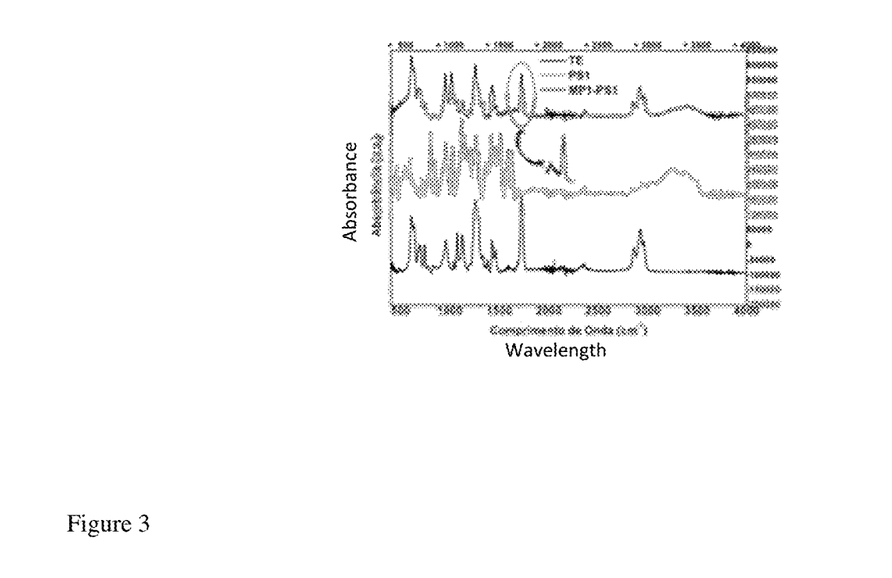
FIG. 3 shows an example of infrared spectroscopy (FT-IR) characterization of the endotracheal tube (ET) without functionalization (black curve), in relation to curcumin (PS1) (red curve) and the functionalized endotracheal tube (PVC-curcumin, MP1-PS1) (blue curve). Characterization analysis of the infrared spectroscopy type was measured in a range between 500-4000 $cm^{-1}$ in the spectrophotometer equipped with a Smart Orbit accessory.

The functionalized polymeric materials prepared in the present invention of type MP1-PS1; MP1-PS2; MP1-PS3; MP2-PS1; MP2-PS2 and MP2-PS3 were characterized by infrared spectroscopy on a Nicolet 5700 (ThermoElectron Corporation) FTIR spectrometer equipped with a Smart Orbit accessory) observing the vibrational bands typical of the polymer and of the specific functional groups of each photosensitizer (PS) bound to the polymer, as shown in FIG. 3.

Figure 4:
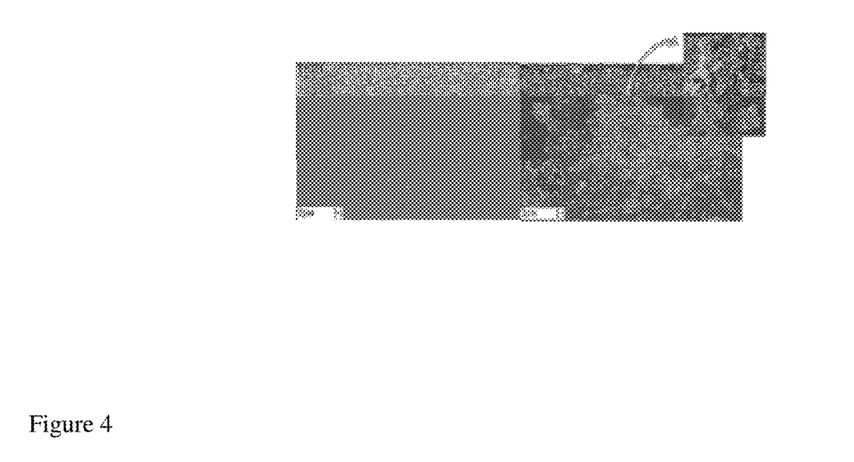
FIG. 4 shows an example of characterization by Scanning Electron Microscopy (SEM): (a) endotracheal tube composed of the polymeric material in the solid state (MP1); (b) endotracheal tube composed of the functionalized polymeric material (MP1) covalently linked to curcumin (PS1) (MP1-PS1). The SEM photomicrographs were obtained in a ZEISS LEO 440 (Cambridge, England) equipment with OXFORD detector (model 7060), operating with 15 kV electron beam, 2.82 A current and 200 pA I probe. The samples were coated with 6 nm gold in a BAL-TEC MED 020 Coating System metallizer (BAL-TEC, Liechtenstein) and kept in a desiccator until the time of analysis. Metallization conditions: chamber pressure=$2.00\times10^{-2}$ mbar; current=60 mA; deposition rate 0.60 nm/s.

The functionalized polymeric materials prepared in the present invention of type MP1-PS1; MP1-PS2; MP1-PS3; MP2-PS1; MP2-PS2 and MP2-PS3 were characterized by Scanning Electron Microscopy (SEM) operating with an electron beam of 15 kV, current of 2.82 A and I probe of 200 pA. The samples were coated with 6 nm gold and kept in a desiccator until the time of analysis. The result of the analysis revealed the presence of the photosensitizer (PS) on the polymeric surface (FIG. 4).

Figure 5:
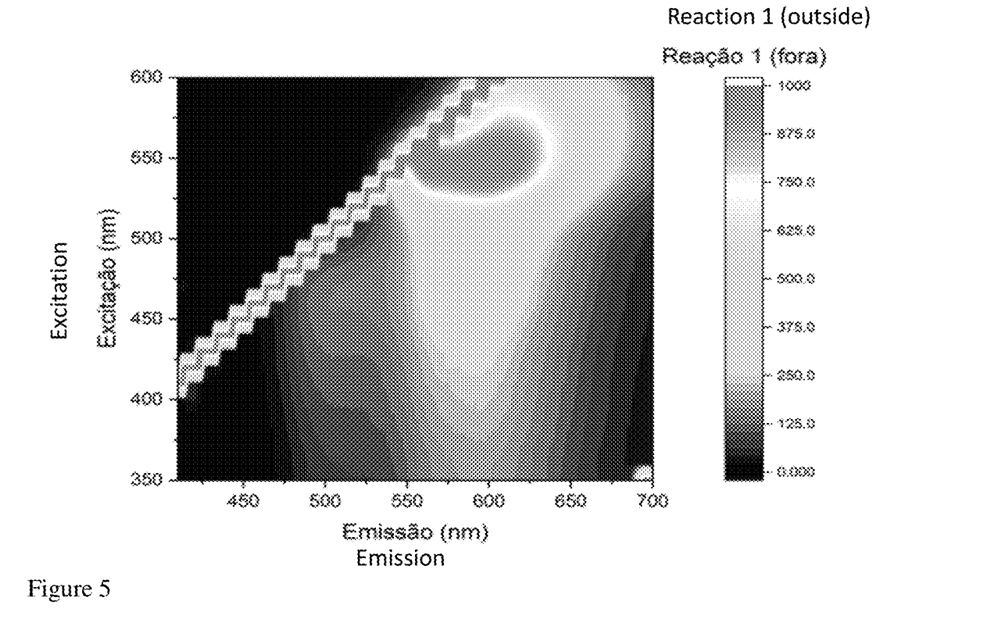
FIG. 5 depicts an example of fluorescence spectroscopy characterization of the endotracheal tube composed of the covalently bonded functionalized material (MP1-PS1) at a range of 350-600 nm excitation wavelength; a) The fluorescence image was obtained from the outer surface of the functionalized endotracheal tube (MP1-PS1)

The functionalized polymeric materials prepared in the present invention of type MP1-PS1; MP1-PS2; MP1-PS3; MP2-PS1; MP2-PS2 and MP2-PS3 were characterized by fluorescence spectroscopy obtained on the outside of the tube. FIG. 5 shows the external surface of the material MP1-PS1 the fluorescence emission at 550 nm typical of curcumin.

Inactivation of Biofilm Growth by MPn-PSm Polymeric Materials

Figure 6:
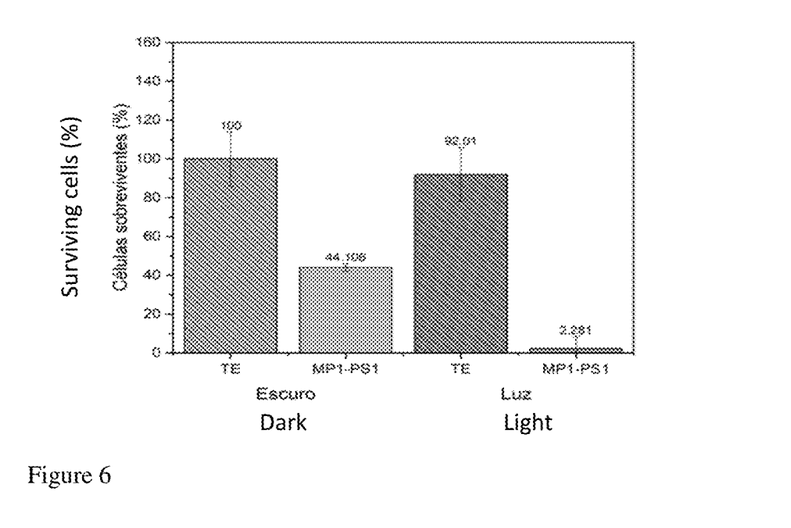
FIG. 6 graphically represents the result of the microbiological analysis of *Staphylococcus aureus* biofilm reduction on curcumin functionalized endotracheal tube by covalent binding MP1-PS1; Orange (////) represents the % reduction of bacteria growth on the biofilms on the surface of TE endotracheal tube (control) and curcumin functionalized endotracheal tube by covalent binding MP1-PS1 (Orange), in the dark; Red (////)-reduction in % of bacteria growth in biofilms on the surface of TE endotracheal tube (control) and endotracheal tube functionalized with curcumin by covalent binding MP1-PS1 (Red) after irradiation with a light source from a LED in the region of 450 nm, for 12 minutes, totaling 50 $J/cm^2$.

The polymeric products functionalized with the sensitizers prepared in the present invention of the type MP1-PS1, MP1-PS2, MP1-PS3, MP2-PS1, MP2-PS2 and MP2-PS3 inactivated the growth of biofilms of bacteria of the gram-positive type in particular *S. aureus* (FIG. 6), or gram-negative in particular, *E. coli* and *Pseudomonas aeruginosa* in the dark, or preferably in the presence of a device emitting light of the appropriate wavelength, namely in the visible (370 to 700 nm) or near infrared (700 to 850 nm) region. The biofilm-forming microorganisms were incubated in suspension with the polymeric materials (MP1 or MP2) covalently linked with the selected photosensitizer (PS) type PS1, PS2, PS3 (MPn-PSm materials) for 24 hours, and then exposed to light from the device emitting light of appropriate wavelength. To determine the efficiency of photodynamic inactivation, the method of cell recovery by colony forming units (CFU/mL). The results revealed that MPn-PSm polymeric materials were efficient in decreasing adherence and inactivating microbial biofilm growth in the absence or preferentially with irradiation with light of appropriate wavelength for each photosensitizer (PS). FIG. 6 of example 1 shows microbial inactivation in the dark (56%) and microbial inactivation after irradiation with 450 nm wavelength light (98%). The example demonstrates that MPn-PSm materials promote biofilm inactivation in the dark and with high efficiency by photodynamic action.

Example 1: Process of Preparing Polymeric Material MP1-PS1 by Covalently Attaching Curcumin (PS1) to an Endotracheal Tube (ET) Made of PVC (MP1)

Preparation of the solution designated Sol A in the present invention: dissolve curcumin (396 mg; 1.07 mmol) and $Cs_2CO_3$ (1.99 g; 6.01 mmol) in dimethylsulfoxide (DMSO; 80 mL).

Weigh the endotracheal tube (ET) (11 g) made of the polymeric material MP1 and submersion in Sol A, at 30° C. to 40° C., for 4 to 8 hours, under nitrogen or argon atmosphere;

Removal of the functionalized TE, consisting of MP1-PS1, from solution, initial washing with DMSO (four times, 20 mL) and finally with ethanol (4 to 10 times, 20 mL), until no curcumin is observed by UV-Vis.

Drying of the functionalized TE (MP1-PS1) preferably at room temperature, under vacuum, for 1 to 3 days.

Storage at room temperature, in the absence of oxygen and light.

The characterization of the curcumin functionalized TE tube (PS1) designated as MP1-PS1 material, was carried out by the various techniques:

UV-Vis: FIG. 2 identifies the UV-vis absorption spectrum of the curcumin functionalized endotracheal tube (FIG. 2, green curve) that shows a band at 430 nm, typical of the absorption spectrum of un-immobilized curcumin in ethanol solution (FIG. 2, blue curve), and the endotracheal tube (TE) (FIG. 2, black curve) that has no absorption in this region.

FTIR: In FIG. 3 the binding of curcumin in endotracheal tube (TE) was confirmed by infrared analysis of curcumin functionalized tube (MP1-PS1, blue curve) compared with endotracheal tube (TE, black curve) and curcumin (PS1, red curve). The spectrum of curcumin showed its characteristic peaks at 3509 $cm^{-1}$ (hydroxyl group-OH), 1600-1650 $cm^{-1}$ (C=O), 1509 $cm^{-1}$ (C=C ethylene), 1250 $cm^{-1}$ (C—O—C ether group). The spectrum of curcumin functionalized endotracheal tube (MP1-PS1, blue curve) in comparison with the spectrum of non-immobilized curcumin (PS1) and endotracheal tube (TE) shows peaks at: 3506 $cm^{-1}$ (hydroxyl group-OH), 1600-1650 $cm^{-1}$ (C=O), 1512 $cm^{-1}$ (C=C ethylene) corroborating the presence of curcumin covalently bound to endotracheal tube (TE).

SEM: The binding of curcumin to endotracheal tube (ET) was also confirmed by scanning electron microscopy (SEM) of the endotracheal tube (ET) (FIG. 4, a) and curcumin functionalized endotracheal tube (MP1-PS1) (FIG. 4, b), where the presence of curcumin on the surface of the endotracheal tube (FIG. 4, b) was detected.

Figure 7:
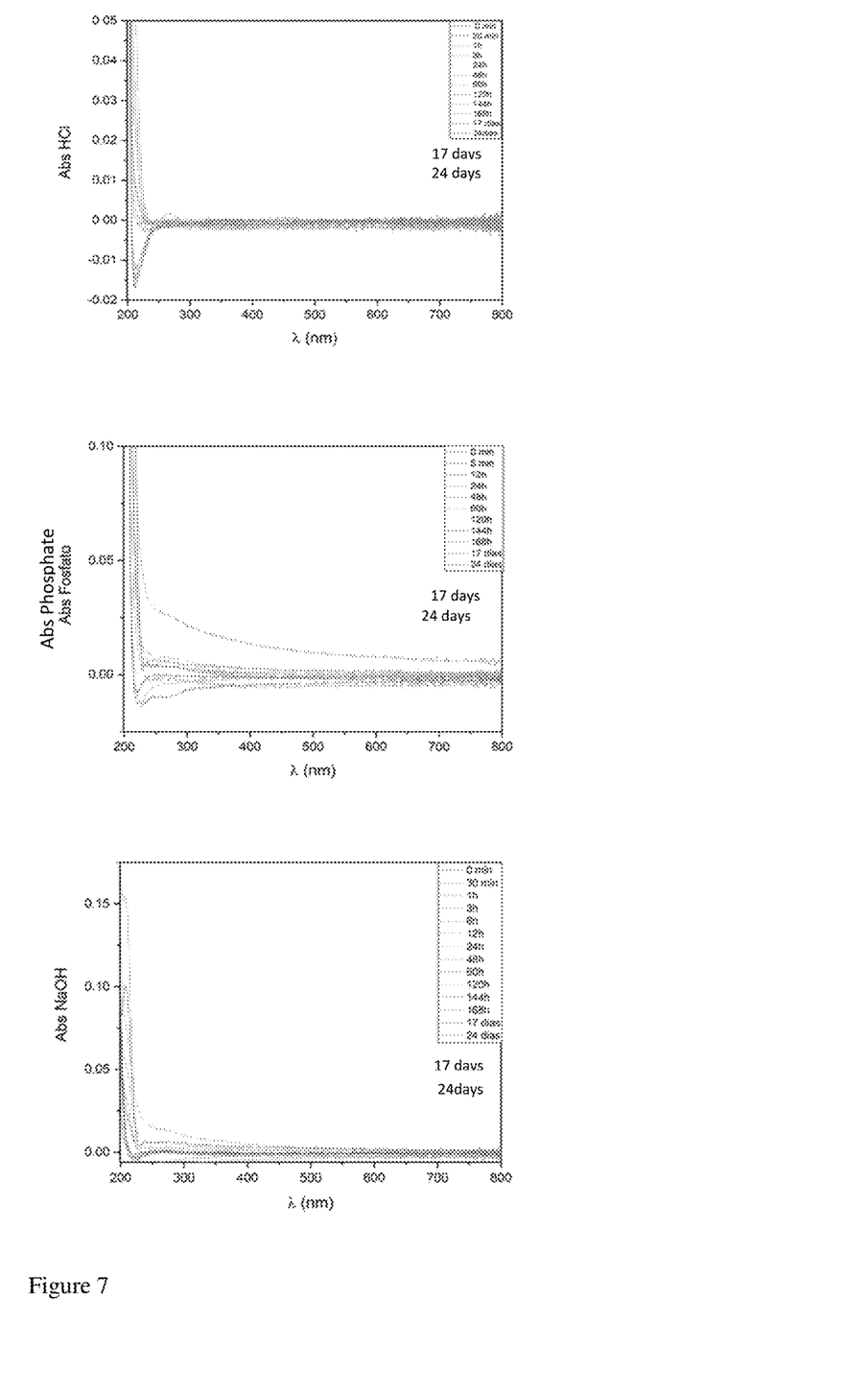
FIG. 7 shows graphs with the UV-Vis spectra of the solution in which the polymeric material MP1-PS1 was immersed at different pH conditions (2, 7 and 10).

Stability of Curcumin Functionalized TE Tube (PS1) Designated as MP1-PS1 Material The stability of the curcumin functionalized endotracheal tube (MP1-PS1) was confirmed by an analysis of the UV-vis absorption spectrum over time at different pHs (2,7,10), mimicking the biological system (FIG. 7 a-c). No release of curcumin from the endotracheal tube was observed at any of the pHs evaluated.

Curcumin Tube Microbiology

The microorganism used was *Staphylococcus aureus* (ATCC 25925). The inoculum was prepared in 15 mL Falcon tubes containing Brain Heart Infusion (BHI) growth culture medium and bacterial inoculum in a 9:1 ratio. The incubation time of the pre-inoculum was 15 hours in a rotary oven at 37° C. at 140 rpm. For biofilm formation the following steps were performed:

The microorganisms in the pre-inoculum were separated from the culture medium by centrifugation (15 min at 1500 rpm);

Two successive washes with Phosphate Buffered Saline (PBS) were performed by centrifugation (15 min at 1500 rpm);

Sterile endotracheal tubes were cut into one-centimeter-long pieces within a sterile environment (Laminar Flow, Airstream, Esco Class II bsc).

Each piece of the previously cut endotracheal tube was inserted into each well of the 24-well plates.

Next to the wells, containing the cut tubes, 900 μL of the liquid culture medium and 100 μL of the bacterial inoculum were added.

The solution was homogenized 6 times with a 1000 μL pipette in each well of the plate;

The biofilms formed were characterized by bacterial colony counts (CFU/mL).

The illumination of the experiments was carried out with a light source composed of LEDs developed by the Technological Support Laboratory-LAT/USP (São Carlos Physics Institute, IFSC/USP). The light source used in the MP1-PS1 irradiation experiments emits radiation at 450 nm and is designed for uniform and continuous irradiation in a 24-well plate, with irradiation of 70 mW/cm2 for 12 minutes. The irradiation measurement was made with the aid of a potentiometer, with a collector with a radius equal to 0.4 cm, totaling an area of 0.5 $cm^2$. To calculate the irradiation in $cm^2$ the equation is used:

$$I=P/A;$$

Where I=Potentiometer irradiation; P=Power measured by the potentiometer and A=area of the potentiometer.

For the calculation of the illumination time required to achieve the required energy dose, the following equation was used:

$$T=D/I;$$

In the equation, T=illumination time, D=desired energy dose, and I is the calculated irradiance of the LED.

During the illuminations the samples were protected with aluminum foil to avoid any external influence that may occur.

Counting of bacterial colonies contained in the Petri dishes with solid BHI culture medium for macroscopic observation of the bacteria were performed after incubating the samples for 24 hours at 37° C. Each experimental group was done in triplicate and colonies between 3 to 30 were counted. The mean of each group was calculated in CFU/mL according to the following equation:

$$CFU/mL=(\#colonies \times \#dilutions)/Volume;$$

The number of colonies is the average obtained by counting the colonies on the plates of the experimental groups performed in triplicate.

After removing planktonic cells by washing all tubes with PBS, they were separated into four experimental groups: biofilms formed on the surface of the endotracheal tube (ET); biofilms formed on the surface of curcumin functionalized tubes (MP1-PS1); biofilms formed on the surface of the ET irradiated under light dose of 50 $J/cm^2$; biofilms formed on the surface of MP1-PS1 irradiated under light dose of 50 $J/cm^2$. The bacterial biofilms were removed from the tube surface with PBS by mechanical agitation and the plating method on solid agar of bacterial colony count was performed for antimicrobial evaluation of the groups.

Thus, the present example refers to the preparation of endotracheal tube (ET) functionalized with curcumin designated as MP1-PS1 material, for applications in patients who require mechanical ventilation and are usually bedridden in hospital beds, with or without association with photodynamic therapy (PDT) to inactivate microorganisms and hinder the formation of microbial biofilms.

In a preferred embodiment of the present invention, the aforementioned endotracheal tube (ET) functionalized with curcumin designated as material MP1-PS1 obtained has the ability to decrease adherence and proceed to the inactivation of microorganisms, through the use associated with the application of a wavelength light source (450 nm) favoring the decontamination process of these catheters.

The invention claimed is:

1. A process for obtaining functionalized polymeric surface comprising:
   a) dissolving of a photosensitizer (PS) having a nucleophilic group (Y) selected from the group consisting of curcumin, chlorin and bacterochlorin, in a base and in an organic solvent selected from the group consisting of dimethylformamide (DMF), dimethoxyethane (DME), tetrahydrofuran (THF), dimethylpyrrolidone, dichloromethane, ethyl acetate or dimethyl sulfoxide (DMSO) to form a solution;
   b) immersing a surface comprising a polymeric material having a leaving group (X) selected from the group consisting of MP1 or MP2, in the solid state in the solution obtained in step (a), wherein said immersing is carried out at a temperature in the range of 0° C. to 40° C.; and
   c) allowing a nucleophilic substitution reaction to occur between leaving groups (X) and nucleophilic groups (Y), said reaction occurring in the organic solvent for a period of time ranging from 0.5 to 48 hours to form functionalized polymeric surface;
   d) drying the functionalized polymeric surface.

2. The process according to claim 1, wherein the base used in step (a) is selected from the group consisting of triethylamine, 1,8-diazabicyclo[5.4.0]undec-7-ene (DBU), 1,5 diazabicyclo[4.3.0]non-5-ene (DBN), pyridine or, selected from the group consisting of $CaCO_3$, $CeCO_3$, NaOH, KOH, $Ba(OH)_2$, $Al(OH)_3$, $Mg(OH)_2$, $Be(OH)_2$, and $Ca(OH)_2$.

3. The process according to claim 1, wherein the organic solvent used in step (a) is dimethyl sulfoxide (DMSO).

4. The process according to claim 1 further comprising, after step (c), a supplemental step of washing with an organic solvent having a lower boiling point than dimethyl sulfoxide (DMSO).

5. The functionalized polymeric surface according to claim 1, wherein a combination is MP1-chlorin, with six distinct variations (II, III, IV, V, VI and VII).

6. The process of claim 1, wherein the drying step (d) is carried out at room temperature under vacuum conditions.

7. The process according to claim 4, wherein the organic solvent having a lower boiling point than dimethyl sulfoxide (DMSO) is ethanol.

* * * * *